(12) United States Patent
McNaughton

(10) Patent No.: US 7,308,773 B1
(45) Date of Patent: Dec. 18, 2007

(54) FISHING LURE

(76) Inventor: Braxton McNaughton, 1404 Casey Rd., Georgiana, AL (US) 36033

( * ) Notice: Subject to any disclaimer, the term of this patent is extended or adjusted under 35 U.S.C. 154(b) by 14 days.

(21) Appl. No.: 10/958,131

(22) Filed: Oct. 4, 2004

(51) Int. Cl.
*A01K 85/00* (2006.01)
(52) U.S. Cl. .................................. 43/42.26
(58) Field of Classification Search ............. 43/42.26, 43/42.24, 42.29; D22/132
See application file for complete search history.

(56) References Cited

U.S. PATENT DOCUMENTS

| | | | | | |
|---|---|---|---|---|---|
| 1,247,955 | A | * | 11/1917 | Grube | 43/42.26 |
| 1,976,695 | A | * | 10/1934 | Boehm | 43/42.26 |
| 2,218,280 | A | * | 10/1940 | Deering | 43/42.26 |
| 2,819,553 | A | * | 1/1958 | Fultz | 43/42.12 |
| 3,105,317 | A | * | 10/1963 | Fox | 43/26.2 |
| 3,389,490 | A | * | 6/1968 | Peters et al. | 43/42.1 |
| D220,839 | S | * | 6/1971 | Sabol | D22/132 |
| D228,761 | S | * | 10/1973 | Cutter | D22/127 |
| D239,447 | S | * | 4/1976 | Radcliff | D22/127 |
| 4,516,352 | A | * | 5/1985 | Firmin | 43/42.26 |
| 4,862,630 | A | * | 9/1989 | Welch | 43/42.26 |
| 4,912,871 | A | * | 4/1990 | Brady | 43/42.26 |
| 5,228,230 | A | * | 7/1993 | Vaught | 43/42.26 |
| 5,915,944 | A | * | 6/1999 | Strunk | 43/42 |
| 5,953,850 | A | * | 9/1999 | Hnizdor | 43/42.26 |
| 6,212,818 | B1 | * | 4/2001 | Huddleston | 43/42.37 |
| 6,237,275 | B1 | * | 5/2001 | Chambers, Sr. | 43/42.29 |

* cited by examiner

*Primary Examiner*—Kurt Rowan
(74) *Attorney, Agent, or Firm*—Kenneth M. Bush; Bush IP Law Group, LLC

(57) ABSTRACT

A flexible artificial fishing lure comprising a lure body and a pair of legs extending from the lure body, wherein each leg has an upper leg portion attached to the lure body and a lower leg portion extending rearward of the upper leg portion. Each lower leg portion tapers inwardly such that the thickness of each lower leg portion gradually decreases from an outer edge toward an inner edge. According to this design, the lower leg portions have greater weight along the outer edge than along the inner edge. In operation, the lower leg portions move multi-dimensionally as the lure is pulled through the water, thereby creating substantial motion and concomitant vibrations for attracting fish.

7 Claims, 1 Drawing Sheet

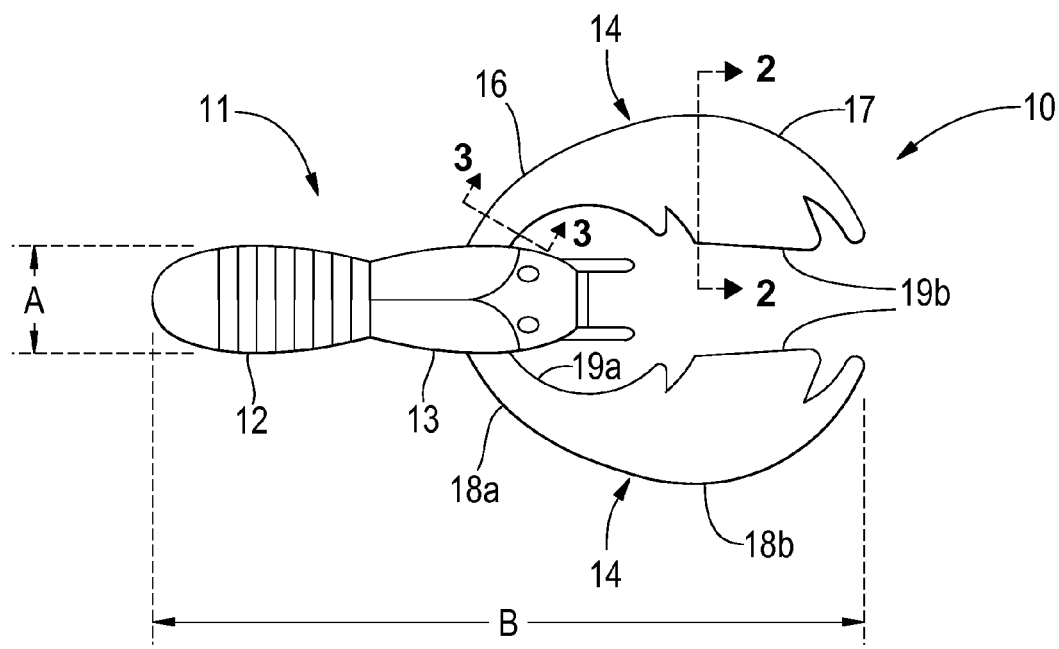
 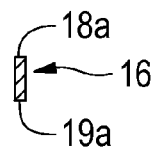
FIG. 1
FIG. 2  FIG. 3

FISHING LURE

FIELD OF THE INVENTION

The present invention is directed to a flexible artificial fishing lure used to attract fish as the lure is pulled through the water.

BACKGROUND OF THE INVENTION

In order to catch fish, artificial fishing lures must first attract fish. Numerous prior art lures have been developed that have various features to attract fish. One such type of artificial lure is made of a soft and flexible plastic, allowing portions of the lure to wobble or vibrate as the lure is pulled through the water, thereby drawing attention to the lure. The more a lure moves, the more attention is drawn to the lure and, hopefully, the more fish are caught. However, different fish appear to be attracted to different types of movements. Accordingly, what are needed are new designs for fishing lures that allow the lures to move in a variety of different manners as the lures are pulled through the water.

SUMMARY OF THE INVENTION

The present invention is a flexible artificial fishing lure comprising a lure body having a forward end and a rearward end, a pair of legs preferably extending from the rearward end of the lure body, wherein each leg has an upper leg portion attached to the lure body and a lower leg portion extending rearward of the upper leg portion. Each upper leg portion preferably has a uniform thickness adjacent the site of attachment to the lure body. Each lower leg portion tapers inwardly such that the thickness of each lower leg portion gradually decreases from an outer edge toward an inner edge. The inner edge of the lower leg portion is preferably at least as thick as the upper leg portion. According to this design, the lower leg portions have greater weight along the outer edge than along the inner edge. This weight distribution feature, in combination with the manner in which the upper leg portions are attached to the lure body causes the lower leg portions to move multi-dimensionally as the lure is pulled through the water, thereby creating substantial motion and concomitant vibrations for attracting fish.

These and other advantages of the invention will become apparent from the following detailed description of the preferred embodiment of the invention.

BRIEF DESCRIPTION OF THE DRAWINGS

A fishing lure embodying the features of the present invention is depicted in the accompanying drawings which form a portion of this disclosure and wherein:

FIG. 1 is a top plan view of the invention.

FIG. 2 is a cross-sectional view taken along line 2-2 of FIG. 1.

FIG. 3 is a cross-sectional view taken along line 3-3 of FIG. 1.

DETAILED DESCRIPTION OF THE PREFERRED EMBODIMENT

The present invention is a flexible artificial fishing lure 10 comprising a lure body 11 having a forward end 12 through which a hook (not shown) can be inserted, a rearward end 13, and a pair of legs 14 preferably extending from the rearward end 13 of the lure body 11, wherein each leg 14 has an upper leg portion 16 attached to the lure body 11 and a lower leg portion 17 extending rearward of the upper leg portion 16. The upper leg portion 16 of each leg 14 preferably has an outwardly curving outer edge 18a and an outwardly curving inner edge 19a. The lower leg portion 17 of each leg 14 has an outer edge 18b and an inner edge 19b. The width of each leg 14 preferably increases from the upper leg portion 16 toward the lower leg portion 17. Each upper leg portion 16 preferably has a uniform thickness adjacent the site of attachment to the lure body 11, shown in FIG. 3. Each lower leg portion 17 tapers inwardly such that the thickness of each lower leg portion 17 gradually decreases from the outer edge 18b toward the inner edge 19b, shown in FIG. 2. The inner edge 19b is at least as thick as the upper leg portion 16. The lure is preferably made from a soft, flexible injection molded plastic, as is well known in the art.

According to this design, the lower leg portions 17 have greater weight along the outer edge 18b than along the inner edge 19b. This weight distribution feature, in combination with the thin portion of the upper leg portions 16 that are attached to the lure body 11, causes the lower leg portions 17 to move apart, rotate back and forth, and move up and down as the lure is pulled through the water. In addition, because the upper leg portion 16 is relatively thin, this allows an increased range of motion up and down by the lower leg portions 17 as the lure is pulled through the water. The foregoing features create substantial motion of the lower leg portions 17 and concomitant vibrations for attracting fish as the lure is pulled through the water.

EXAMPLE OF LURE DIMENSIONS

Lure (10): 4.375 inch total length (B).

Body (11): 3.0 inch length, 0.5 inch width (A), 0.375 inch thickness.

Leg (14): 2.5 inch length.

Upper leg portion (16): 0.5-0.75 inch length, 0.25 inch minimum width, 0.05-0.0625 inch thickness.

Lower leg portion (17): 1.75-2.0 inch length, 0.75 inch maximum width, 0.0625 inch thickness of inner edge (19b), 0.1563-0.1875 inch thickness of outer edge (18b).

It is to be understood that the form of the invention shown is a preferred embodiment thereof and that various changes and modifications may be made therein without departing from the spirit of the invention or scope as defined in the following claims.

The invention claimed is:

1. A fishing lure, comprising:
   a. a body; and
   b. a first leg attached to a first side of said body and a second leg attached to an opposing second side of said body, wherein each said first and second leg has a proximal end attached to said body and a distal end extending rearward from said proximal end;
   c. wherein each said proximal end has top and bottom surfaces substantially parallel to each other such that said proximal end has a uniform thickness at the site of attachment of said proximal end to said body; and
   d. wherein each said distal end has an outer edge, an inner edge, a top substantially planar surface, and a bottom substantially planar surface, wherein said top and bottom surfaces continuously converge from said outer edge toward said inner edge in a substantially linear manner such that the thickness and weight of said distal end continuously decreases from said outer edge toward said inner edge.

2. A fishing lure according to claim 1, wherein said thickness of said proximal end adjacent said site of attachment is less than or equal to 0.0625 inch.

3. A fishing lure according to claim 1, wherein said thickness of said outer edge is between about 0.1563 inch and about 0.1875 inch.

4. A fishing lure according to claim 1, wherein said thickness of said inner edge is greater than or equal to 0.0625 inch.

5. A fishing lure, comprising:
 a. a body; and
 b. a first leg attached to a first side of said body and a second leg attached to an opposing second side of said body, wherein each said first and second leg comprises a proximal end attached to said body and a distal end extending rearward from said proximal end;
 c. wherein each said distal end comprises an outer edge, an inner edge, a top substantially planar surface, and a bottom substantially planar surface, wherein said top and bottom surfaces continuously converge from said outer edge toward said inner edge in a substantially linear manner such that the thickness and weight of said distal end continuously decreases from said outer edge toward said inner edge.

6. A fishing lure according to claim 5, wherein each said proximal end comprises top and bottom surfaces substantially parallel to each other such that said proximal end has a uniform thickness at the site of attachment of said proximal end to said body.

7. A fishing lure according to claim 6, wherein the thickness of said proximal end adjacent said site of attachment is less than or equal to 0.0625 inch, the thickness of said outer edge is between about 0.1563 inch and about 0.1875 inch, and the thickness of said inner edge is greater than or equal to 0.0625 inch.

* * * * *